United States Patent [19]

Harms

[11] Patent Number: 5,213,467
[45] Date of Patent: May 25, 1993

[54] SYSTEM FOR TRANSPORTATION OF PAPER ROLLS

[75] Inventor: George Harms, Winnipeg, Canada

[73] Assignee: Muzeen & Blythe Ltd., Winnipeg, Canada

[21] Appl. No.: 850,997

[22] Filed: Mar. 12, 1992

Related U.S. Application Data

[63] Continuation-in-part of Ser. No. 751,101, Aug. 28, 1991, abandoned.

[51] Int. Cl.$^5$ .................................................. B65G 7/00
[52] U.S. Cl. ............................ 414/572; 414/911; 414/684; 414/535; 414/746.8; 414/749; 414/373; 254/93 HP
[58] Field of Search ............ 414/910, 911, 572, 745.9, 414/9, 389, 746.1, 397, 746.8, 401, 745.7, 749, 684, 584, 535, 222; 104/164, 48, 50, 127, 128, 137; 254/93 HP

[56] References Cited

PUBLICATIONS

Brochure of Airoller by Harmax.

Primary Examiner—Frank E. Werner
Attorney, Agent, or Firm—Adrian D. Battison; Stanley G. Ade; Murray E. Thrift

[57] ABSTRACT

A conveyor for large cylindrical bodies such as paper rolls, includes an elongate track defined by a channel member and a beam mounted within the channel member. The beam defines a pair of rolling surfaces upon which a short length carriage runs longitudinally of the beam. The carriage has an upper surface for receiving the roll and transporting the roll in a direction longitudinal of the axis of the roll. The carriage is pulled longitudinally of the track by a cable driven by an air motor positioned at one end of the track. A portion of the track can be lowered for an initial raised position in which the carriage is above the side edges of the track to a lower position so the roll can be simply rolled onto the carriage. The lower position is achieved by deflating an elongate air bag inside the channel and underneath the beam. A second carriage can be positioned on the track for transporting the roll from a used position to a discharge position. The discharge carriage includes a turn table which can be rotated through 90° to a position overlying a pair of cylinders which lift a rear edge of the turntable portion for pivotal movement about a front edge to dump the roll from the carriage.

15 Claims, 5 Drawing Sheets

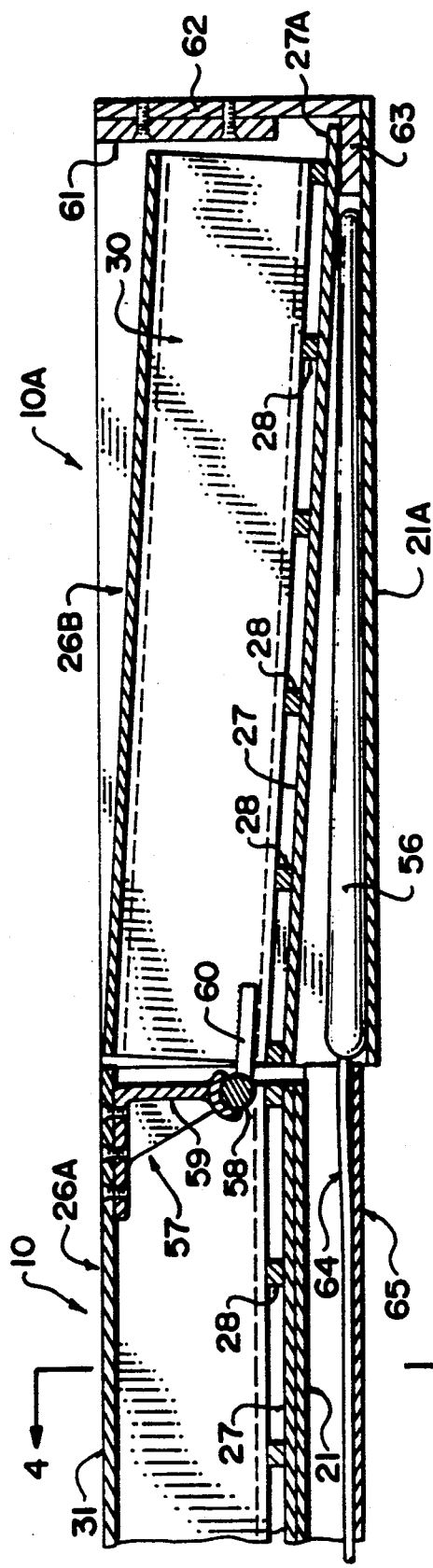
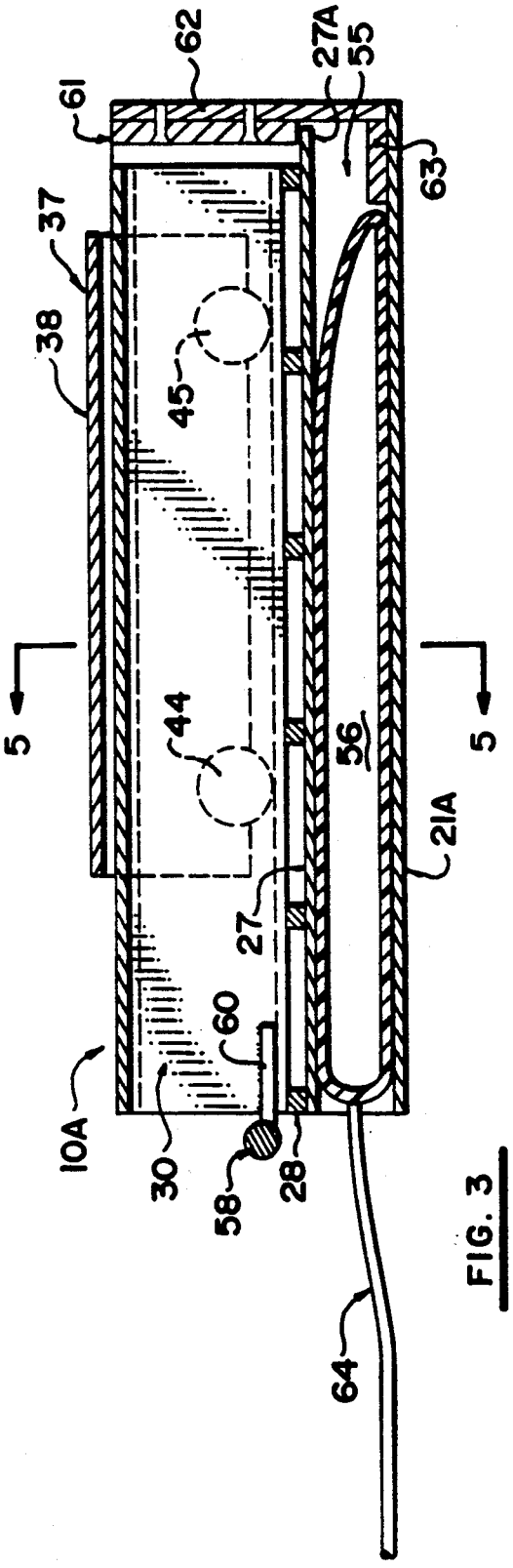
FIG. 2
FIG. 3

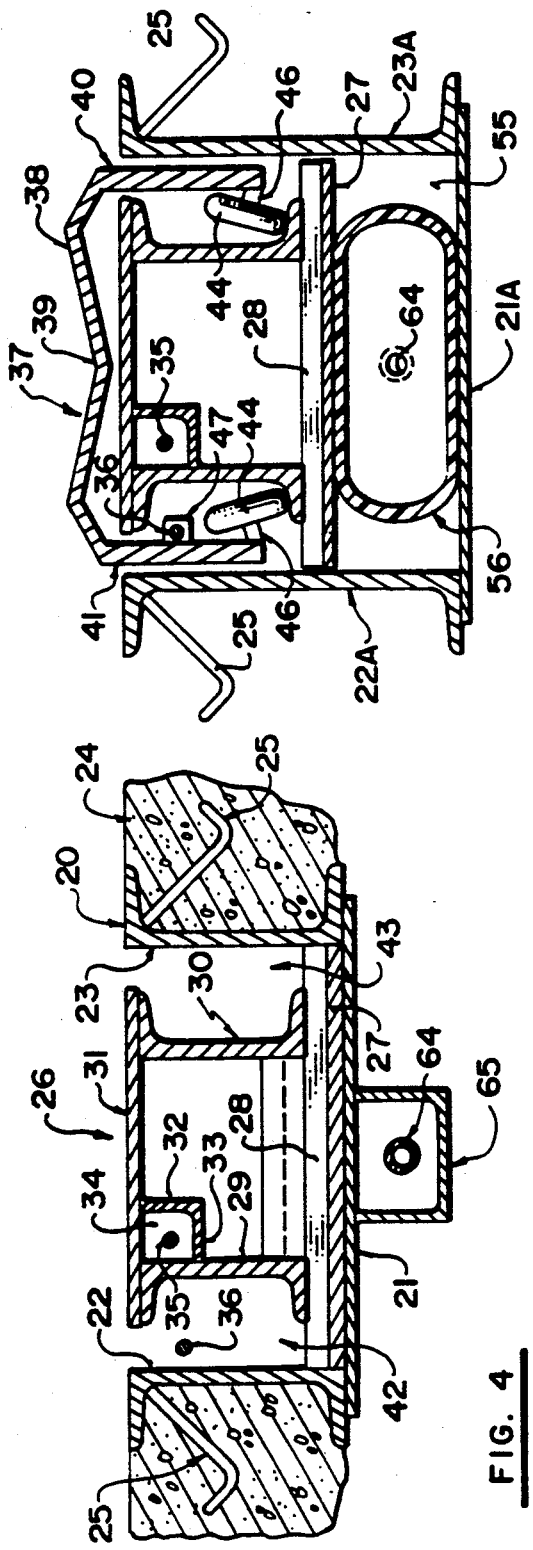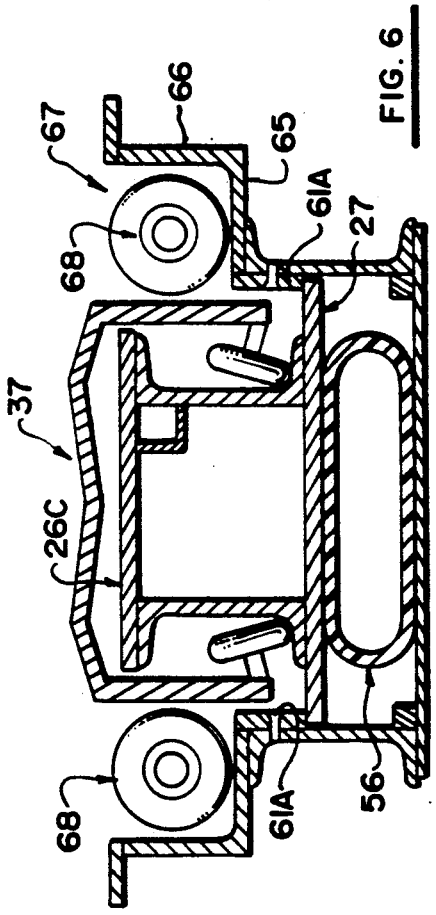

SYSTEM FOR TRANSPORTATION OF PAPER ROLLS

BACKGROUND OF THE INVENTION

This application is a continuation-in-part of application Ser. No. 751,101 filed Aug. 28, 1991 and now abandoned.

This invention relates to a system for transportation of large heavy cylindrical objects such as paper rolls for example for transportation of the rolls into a paper handling machine.

A system for handling paper rolls has been available for many years and comprises an elongate channel member which is laid into the floor so that upper edges of the channel are substantially flush with the floor surface presenting an open top of the channel at the floor surface. In the floor channel is mounted a beam which provides longitudinal roller surfaces for receiving the rollers of a carriage. The carriage has a substantially horizontal upper surface for receiving the roll and a pair of depending sides which extend into the channel and carry the rollers which run along the roller surfaces of the beam. The carriage is moved longitudinally of the channel by a flexible elongate drive member such that chain or cable which is wrapped around guide pulleys and can be driven by an air motor located at one end of the channel. One part of the cable or chain is attached to the carriage so that the chain or cable moves along the channel the carriage is pulled with the roll on top of the carriage from one position to another.

Generally the horizontal surface of the carriage includes a shallow V-shaped groove with the apex of the V extending longitudinally of the channel so that the roll can be pushed manually or by machine onto the horizontal surface to be received within the V-shaped groove for movement longitudinally of the axis of the roll.

Up till now the application of the roll to the carriage and the discharge of any remaining roll parts from the carriage has been carried out simply by pushing the roll so that it rolls onto the carriage. This is of course a severe inconvenience in that the rolls can be very heavy and can be dangerous since the rolls of course tend to roll back off the carriage with a significant amount of momentum in view of the very heavy weight of the roll even though the height that the roll must achieve to enter onto the carriage is very low.

SUMMARY OF THE INVENTION

It is one object of the present invention, therefore, to provide an improved transportation system which can allow simpler loading and discharge of the roll relative to the carriage.

According to the first aspect of the invention, there is provided a transport system for a large cylindrical body comprising an elongate channel member mounted in a floor surface, the channel member having parallel upper side edges positioned at a height substantially flush with the floor surface, an elongate beam mounted in the channel member and extending at least partly therealong, a carriage having an upper surface shaped for receiving and locating the body thereon for transportation of the body therewith, a plurality of rollers mounted on the carriage and shaped to run along the beam to move the carriage therealong, an elongate flexible drive element positioned in the channel member and coupled to the carriage, means for driving the drive element longitudinally of the channel member for transporting the carriage therealong, at least a portion of the beam being mounted in the channel member for movement vertically therein from a raised position, in which the upper surface of the carriage is located at a height to hold the body above the upper side edges for longitudinal movement of the body with the carriage, to a lowered position in which the carriage is displaced below the upper side edges.

One or more embodiments of the invention will now be described in conjunction with the accompanying drawings, in which:

BRIEF DESCRIPTION OF THE DRAWINGS

FIG. 2 is a cross sectional view along the lines 2—2 of FIG. 1;

FIG. 3 is the same cross sectional view of a part of FIG. 2 showing the beam and the carriage in a raised position;

FIG. 4 is a cross sectional view along the lines 4—4 of FIG. 2;

FIG. 5 is a cross sectional view along the lines 5—5 of FIG. 3;

FIG. 6 is a cross sectional view similar to that of FIG. 5 showing a modified arrangement;

In the drawings like characters of reference indicate corresponding parts in the different figures.

DETAILED DESCRIPTION

Figure 1:
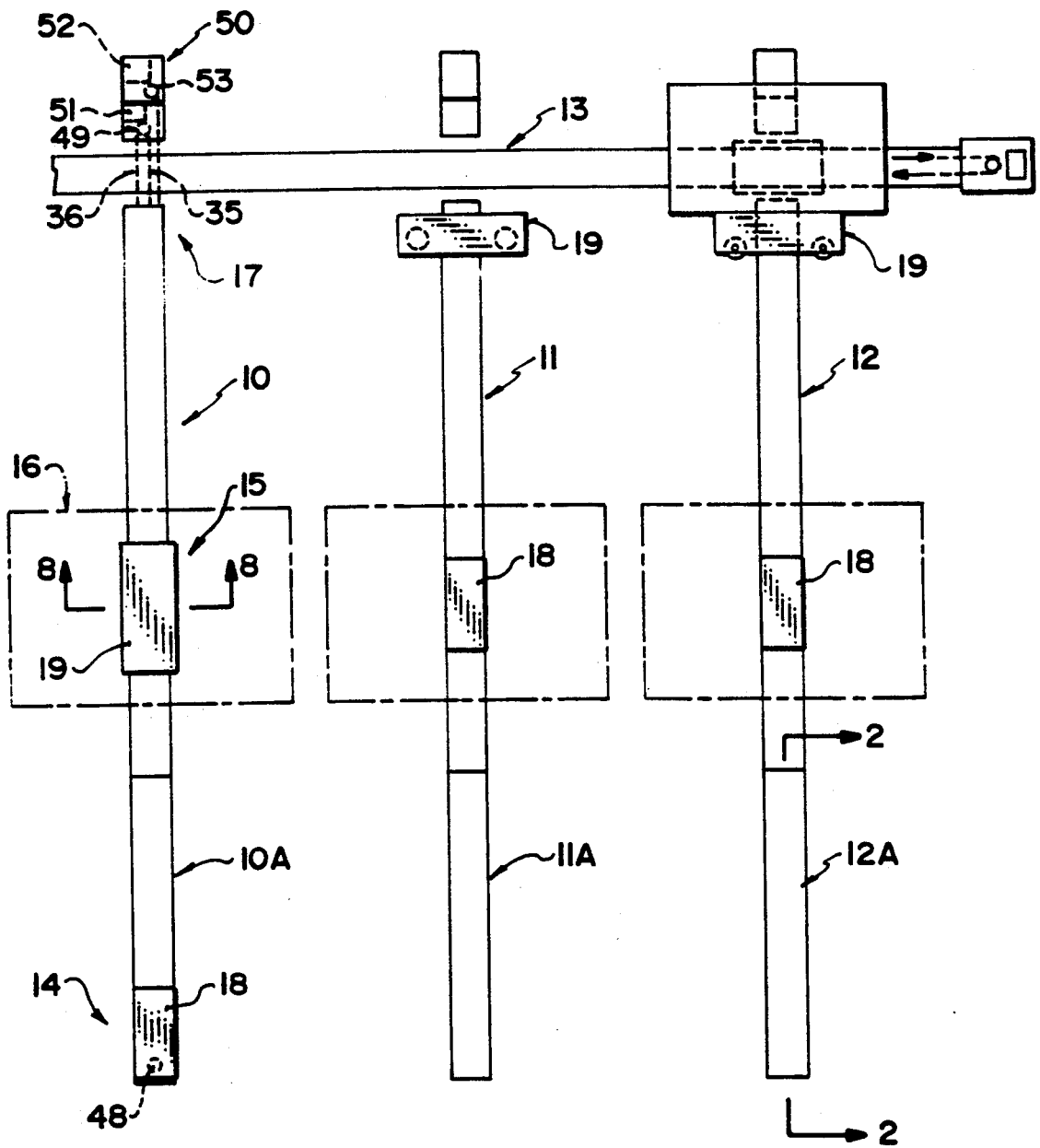
FIG. 1 is a schematic plan view of a system for transportation of heavy cylindrical objects such as paper rolls in accordance with the present invention.

The system illustrated generally in FIG. 1 includes four conveyor tracks indicated at 10, 11, 12 and 13 respectively. The conveyor tracks 10, 11 and 12 are arranged in parallel spaced relation and each is at right angles to a return conveyor 13. Each of the conveyor tracks 10, 11 and 12 includes a loading end 14, a central position 15 adjacent a machine schematically indicated at 16 and a discharge end 17. The conveyor track 13 runs along the end of each of the tracks 10, 11 and 12 to receive a roll discharged from a respective one of the tracks to transport the roll in a longitudinal direction at right angles to the tracks 10, 11 and 12.

Each of the conveyor tracks 10, 11 and 12 includes a pair of carriages 18 and 19 which can be driven along the conveyor track from the loading end 14 to the discharge end 17 but of course the carriages cannot pass. It is intended, therefore, that the carriage 18 will act generally from the loading area 14 to the machine 16 in a loading action and the carriage 19 will act from the machine 16 to the discharge end. The carriages are of a different construction as described hereinafter.

The basic construction of the conveyor track is shown best in FIG. 4. The conveyor track comprises a channel member 20 including a flat base 21 and a pair of upstanding sides 22 and 23. The flat base is formed a flat plate of metal. The upstanding sides are each formed from a channel iron having the base web of the channel iron standing vertically upwardly from the base plate 21 and the flanges of the channel iron facing outwardly for engaging the material of the floor surface indicated at 24. Reinforcing strips 25 are attached to the outside surface of the channel iron at an angle so as to project downwardly and outwardly into the floor surface 24 with a portion turned at right angles to provide an effective anchor of the structure in the floor surface, generally concrete.

Inside the channel member is mounted a beam 26 comprising a base plate 27, a plurality of cross members 28 in parallel spaced relation (see FIG. 2) and a pair of channel irons 29 and 30. The channel irons are welded to the cross members 28 which are in turn welded to the base plate 27. The cross members 28 and base plate 27 are dimensioned so that they fit within the channel between the channel irons 22 and 23.

The channel irons 29 and 30 again have the flanges thereof facing outwardly and include a top plate 31 thus forming the beam into a rigid structure. A pair of right angle walls 32 and 33 are positioned inside one corner of the interior of the beam to define a channel 34 for receiving a cable length 35 for driving the carriage as described hereinafter. The second run of the cable is indicated at 36.

As best shown in FIG. 5, the carriage is indicated at 37 and comprises a horizontal top plate 38 which is shaped with a V-shaped groove 39 for receiving the roll therein in stable position supported thereby. The length of the top plate 38 is such that it extends along a portion of the channel and the beam. The width of the top plate is such that it extends across the top plate 31 of the beam and terminates at a position above the grooves or receptacles defined between the outside edge of the beam and the inside surface of the channel. The carriage further includes a pair of side plates 40 and 41 depending downwardly from the side edges of the top plate into the groove areas 42 and 43. Each side plate carries a pair of rollers 44 and 45 which are positioned on the inside surface of the side plate and are arranged at an angle so that the roller runs on the flange of the channel of the beam and particularly is guided by the lower flange and the web and runs in the corner therebetween. Thus each of the rollers has an axle 46 which is inclined upwardly and inwardly so that the roller is inclined upwardly and outwardly to provide the effect of stabilizing the carriage to prevent twisting and side to side movement. The cable run 36 is clamped to the carriage by a bracket schematically indicated at 47. The cable lengths 35 and 36 are wrapped around an idler pulley 48 at the feed end of the conveyor track and are driven by a drive pulley 49 mounted in a housing 50 just beyond the discharge end of the conveyor track. The drive pulley 49 is driven by an air motor 51 so that rotation of the pulley 49 driven by the drive motor 51 causes the carriage 18 to move longitudinally of the conveyor track. The second carriage 19 includes a second motor 52 and a second drive pulley 53 mounted within the housing 50 to provide a second pair of cable runs (not shown) cooperating with an idler pulley (not shown) at the feed end of the conveyor track. The cables simply run side by side without interference within the housing 34 and freely within the area 42.

The basic construction of the conveyor is described above and each of the conveyors has that basic construction including the channel, beam and carriage.

Each of the conveyor tracks 10, 11 and 12 however includes an end section 10A, 11A and 12A respectively which constitutes a drop section allowing the carriage to be lowered so that the upper surface of the carriage is below the top flange of the channel that is below the surface of the floor 24.

In section 10A, therefore, the channel is modified to the construction shown in FIG. 5. In this construction the channel is formed from channel irons 22A and 23A which are of increased depth to form a chamber 55 underneath the base plate 27 of the beam and above the base plate 21A of the channel. This chamber 55 receives an elongate air bag 56 which extends along the full length of the drop section 10A and across the full width of the channel when in the deflated condition shown in FIG. 2.

The beam 26 is split into two portions 26A and 26B which are coupled at a hinge arrangement 57 allowing the outer end of the portion 26B to move upwardly and downwardly by pivotal action about a pivot pin 58. The pivot pin 58 is carried upon a bracket assembly 59 attached to the end of the portion 26A and upon a bracket 60 which projects outwardly from the end of the portion 26B. This pivot assembly therefore prevents the inner end of the portion 26B from moving vertically but allows the pivotal action about an axis transverse to the channel member.

As shown in FIG. 2, the plate 27 includes a portion 27A projecting beyond the end of the channel irons to act as an abutment to locate the end of the portion 26B in its lowermost and uppermost positions. In the upper position portion 27A engages an abutment 61 on an end plate of the channel member 62. In the lowered position, the portion 27A engages an abutment 63 at the bottom corner of the channel adjacent the end plate. The air bag is fed by a pneumatic line 64 extending through a drain channel 65 on the underside of the plate 21 of the channel member of the portion 26A. The air bag is supplied from air pressure from the housing 50 where the control unit for the drive motors and for the lifting and lowering of the end portion 26B is provided. When deflated, the end portion 26B is lowered to the position in FIG. 2 so that the whole of the upper surface of the carriage is below the upper edge of the channel. When the bag is inflated, the end portion is forced upwardly until stopped by the portion 27A and in this position the beam has its upper plate substantially in the plane of the upper surface of the channel so that the carriage upper surface 38 is located above the floor surface to transport the roller at a position slightly above the floor surface.

In an alternative arrangement shown in FIG. 6, the beam indicated at 26C is essentially of the construction described before. The carriage 37 is also of the construction shown and described previously. In this arrangement, however, the channel is modified in that the side walls of the channel are formed from a compound construction so as to define a step 65 extending horizontally outwardly and then vertically upwardly as indicated at 66 to define an area 67 outside the side walls of the carriage. Within this area is provided a longitudinal roller 68 mounted upon bearings at ends of the roller. In the raised position of the beam as shown in FIG. 6, the base plate 27 of the beam engages a pair of side abutments 61A on the inside surface of the channel so as to prevent further upward movement. In this embodiment the beam is not pivoted but is free to move along its whole length vertically upwardly and downwardly with simply a sheer action at the junction between the fixed portion and the movable portion of the beam. The abutment 61A thus control the height of the beam in the raised position along the full length of the beam. The beam is moved again vertically upwardly and downwardly by the inflatable air bag 56. In this arrangement, in the lowered position of the beam, the carriage is below the rollers 68 so that the roll is deposited onto the rollers and allowed to rotate about its axis by rotation of the rollers as the surface of the roll moves across the rollers.

Figure 7:
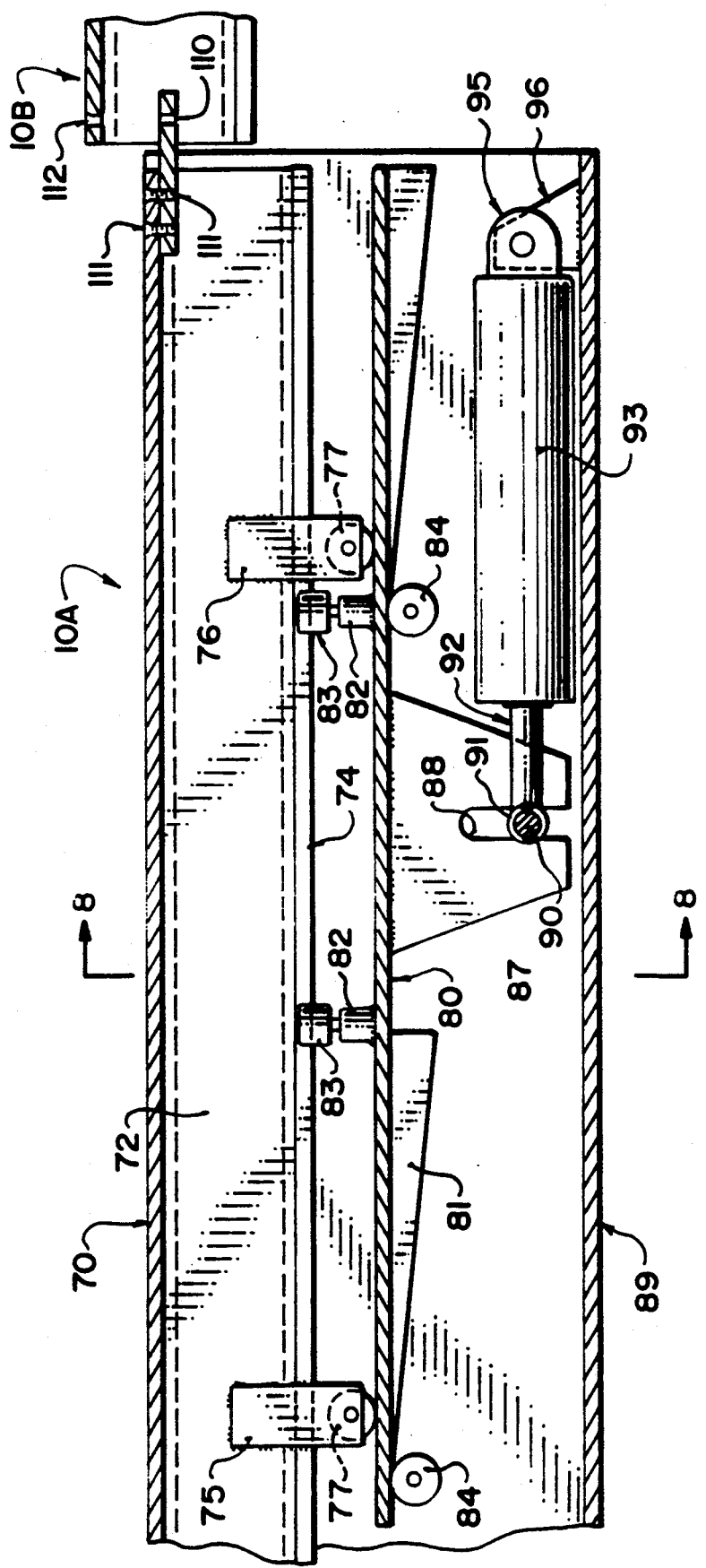
FIG. 7 is a cross-sectional view along the lines 7—7 of FIG. 8 showing a modified carriage lifting system.
Figure 8:
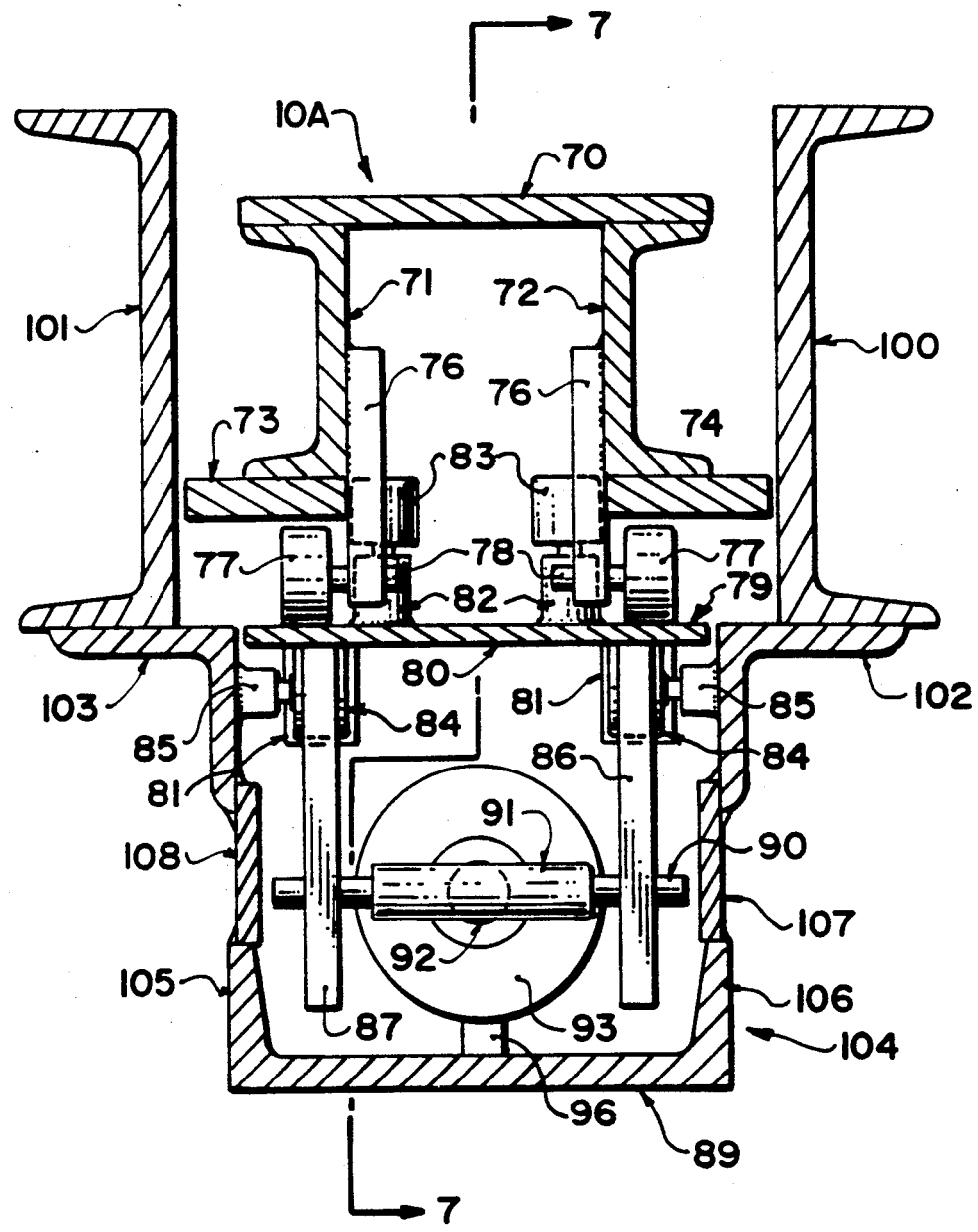
FIG. 8 is a cross sectional view along the lines 8—8 of FIG. 7.

Turning now to FIGS. 7 and 8, there is shown a beam section 10A arranged for vertical movement relative to an adjacent beam section 10B on one end and an adjacent section (not shown) at the opposed end. The beam 10A comprises a top flange 70 and a pair of back to back "C" channels 71 and 72 arranged along respective sides of the top plate 70. The beam further includes a pair of flanges 73 and 74 welded to the bottom edge of the "C" channels 71 and 72 and projecting outwardly to the sides beyond the outer edge of the top plate 70. Two pairs of depending lugs 75 and 76 are welded to the inside face of the "C" channel and to the inside face of the flanges 73 and 74 and project downwardly therefrom to a position below the flanges 73 and 74. Each of the lugs carries a roller 77 at a lower end thereof mounted upon an axle 78 passing horizontally through the lug thus defining an axis of rotation of the roller 77. The rollers are arranged in pairs so that there is a first pair of lugs 75 adjacent one end of the beam and a second pair of lugs 76 adjacent the other end of the beam. Both pairs are spaced inwardly from the ends of the beams.

The beam provides a mounting arrangement for the carriage as previously described and for the longitudinal drive element as previously described which are received upon and within the beam as set forth hereinbefore.

The beam sits upon a ramp member generally indicated at 79 including a flat plate 80 and a plurality of ramp surfaces 81. The rollers 77 can thus readily roll along the flat upper surface of the plate 80. The plate 80 includes a plurality of upstanding roller mounts 82 each including a roller 83 arranged for rotation about a vertical axis with the peripheral surface of the roller in engagement with the inside surface of a respective one of the flanges 73 and 74 so as to guide relative longitudinal movement of the beam and the ramp member. As shown in FIG. 7 there are two pairs of such vertical rollers positioned toward the center of the ramp member and at positions which allow longitudinal movement of the ramp member without interengagement between the rollers 83 and rollers 77 and their respective mounting arrangements.

The ramp surfaces 81 are formed as triangular shaped members attached on the underside of the flat plate 80 having a width sufficient to receive the surface of a support roller 84 of the receiving channel member. The rollers 84 are mounted on roller supports 85 carried upon sides of the channel member and projecting horizontally inwardly therefrom to a position to align with the longitudinally extending ramp surfaces of the ramp member.

On the underside of the plate 80 is attached a pair of depending plates 86 and 87. Each of these plates includes a vertical slot 88 as best shown in FIG. 7 with the plate extending downwardly toward a base 89 of the channel member. A transverse rod 90 extends through the slots 88 which are aligned to receive the rod and a transverse rod is connected by a coupling 91 to the piston 92 of a air cylinder 93. A rear end coupling 95 of the air cylinder is connected to a support bracket 96 mounted in the channel member. The channel member is formed from two "C" channels 101 which are arranged back to back and defining a space therebetween sufficient to receive the beam. The lower flange of the "C" channels is welded to right angle members 102, 103 which extend inwardly and then downwardly from the "C" channels to form a side wall of a base portion generally indicated at 104 of the channel member. The base member includes the base wall 89 and two upstanding side walls 105 and 106. The base channel is fabricated from a "C" channel member including the base 89, a pair of upstanding side wall plates 107, 108 and the downwardly depending sides of the angles 102 and 103.

In operation, actuation of the air cylinder 93 forces the plates 86 and 87 in a longitudinal direction thus driving the ramp member longitudinally on top of the rollers 84. As the ramp member moves toward the left into an open space provided by the reduced length of the ramp member relative to the full length of the channel member, the ramp surfaces 81 run over the rollers 84 to raise the flat plate 80 of the ramp member vertically upwardly. The ramp member also moves relative to the roller 77 and also guides the movement using the rollers 83 in contact with the beam. The beam 10A has a length equal to the length of the channel member and is therefore confined against longitudinal movement by engagement with the beam section at each end of the channel member. The effect on the beam therefore is simply to move the beam vertically from the retracted position to the raised position for the purposes and arrangement as previously described.

It will be noted that the beam can be readily disassembled for cleaning and maintenance purposes simply by lifting the beam section out of the channel member since the beam is free from the ramp member and can thus move simply vertically away from the ramp member for removal. Subsequently the ramp member itself can be readily removed simply by vertical movement since it rests solely upon the rollers of the channel member and since it is coupled to the air cylinder by the slot arrangement of the depending plates.

In order to prevent the beam from tipping by the application of an uneven load at one end of the beam, each end of the beam includes an outwardly extending abutment flange 110 which is screw fastened by screws 111 to the underside of the top plate 70. The abutment flange 110 projects outwardly from the end so as to engage under the top plate of the next adjacent beam portion when the beam portion 10A is raised. Thus force at one of the beam cannot depress that end of the beam in a teeter-totter action since the opposed end of the beam cannot be raised it is held down by the next adjacent beam portion. During assembly, the abutment flange can be screw fastened by a screw opening 112 to the next adjacent beam portion and can be disconnected by removing the screws 111 so the beam is maintained supported and properly located and can be readily removed by the lifting action previously described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A transport system for a large cylindrical body comprising an elongate channel member mounted in a floor surface, the channel member having parallel upper side edges positioned at a height substantially flush with the floor surface, an elongate beam mounted in the channel member and extending at least partly therealong, a carriage having an upper surface shaped for receiving and locating the body thereon for transportation of the body therewith, a plurality of rollers mounted on the carriage and shaped to run along the beam to move the carriage therealong, an elongate flexible drive element positioned in the channel member and coupled to the carriage, means for driving the drive element longitudinally of the channel member for transporting the carriage therealong, at least a portion of the beam being mounted in the channel member for lifting movement vertically therein from a lowered position in which the carriage is displaced below the upper side edges to a raised position, in which the upper surface of the carriage is located at a height to hold the body above the upper side edges for longitudinal movement of the body with the carriage, and drive means for effecting said lifting movement.

2. The system according to claim 1 wherein the beam comprises a first and a second channel iron arranged in spaced relation with a web of the first arranged adjacent a web of the second and each one of the first and second channel irons having a pair of flanges extending substantially horizontally from the web in a direction away from the other one of the first and second channel irons the carriage including a pair of depending sides each extending from a position above the beam to a position along side an outer open face of the respective channel iron, each depending side carrying roller means extending therefrom inwardly of the respective channel iron and resting upon a lower one of the flanges.

3. The system according to claim 1 including a pair of cylindrical rollers each extending longitudinally of the channel member along a respective side of the beam for allowing rotation of the body on the rollers when the portion of the beam and the carriage thereon is in the lowered position.

4. The system according to claim 1 wherein the drive means includes a ramp member movable longitudinally of the beam relative to the beam and relative to the channel member and arranged such that longitudinal movement thereof causes upward movement of the beam.

5. The system according to claim 4 wherein the drive means includes an air cylinder mounted within the channel member for driving the ramp member longitudinally of the channel member.

6. The system according to claim 4 wherein the drive means includes ram means mounted within the channel member for driving the ramp member longitudinally of the channel member, said ram means including a transverse driving member and the ramp member including a downwardly extending flange having a slot therein for engaging over the driving member such that the ramp member can be lifted directly vertically from the ram means.

7. The system according to claim 6 wherein the rollers are mounted on sides of the channel member and extend inwardly from the sides.

8. The system according to claim 4 wherein the ramp member is carried on rollers mounted on the channel member, the rollers having a horizontal axis of rotation allowing said longitudinal movement of the ramp member.

9. The system according to claim 4 including first roller means positioned between the ramp member and the beam and providing vertical support of the beam on the ramp member, second roller means positioned between the ramp member and the channel member and providing vertical support of the ramp member on the channel member and third roller means positioned between the ramp member and the beam and arranged to provide horizontal guiding of the ramp member relative to the beam in a longitudinal movement thereof.

10. The system according to claim 9 wherein the beam includes a pair of downwardly depending flange members each carrying a respective one of the first roller means for rotation about a horizontal axis defined by the flange, each of said first roller means being mounted by the respective flange under a respective side of the beam for rolling upon the ramp member.

11. The system according to claim 10 wherein the ramp member includes a flat horizontal plate on which the first roller means rolls.

12. The system according to claim 11 wherein the third roller means comprises a pair of rollers upstanding from the flat horizontal plate, each defining a vertical axis of rotation, the rollers being arranged to engage an inwardly facing surface of the beam to guide relative movement of the beam along the ramp member.

13. The system according to claim 10 wherein the beam and the ramp member are arranged such that the beam can be lifted off the ramp member by simple vertical movement therefrom.

14. The system according to claim 4 wherein the ramp member includes a flat plate member and a plurality of inclined ramp surfaces on an underside thereof, the ramp surfaces being arranged to increase in depth from the flat plate member, the channel member including a plurality of rollers mounted thereon each for engaging a respective one of the ramp surfaces.

15. The system according to claim 1 wherein each end of said portion of the beam includes a longitudinally projecting abutment member for engaging an adjacent beam portion such that when in the raised position, the abutment members engage beam portions on either side of said portion of the beam to prevent tipping of said portion of the beam.

* * * * *